US00RE46333E

(19) United States
(12) Reissued Patent
Huang et al.

(10) Patent Number: US RE46,333 E
(45) Date of Reissued Patent: Mar. 7, 2017

(54) HIGH-SIDE SENSING OF ZERO INDUCTOR CURRENT FOR STEP-DOWN DC-DC CONVERTER

(71) Applicant: Intersil Americas LLC, Milpitas, CA (US)

(72) Inventors: Congzhong Huang, Plano, TX (US); Sisan Shen, Plano, TX (US)

(73) Assignee: Intersil Americas LLC, Milpitas, CA (US)

(21) Appl. No.: 14/092,826

(22) Filed: Nov. 27, 2013

Related U.S. Patent Documents

Reissue of:
(64) Patent No.: 8,067,929
Issued: Nov. 29, 2011
Appl. No.: 12/204,344
Filed: Sep. 4, 2008

U.S. Applications:
(60) Provisional application No. 61/033,259, filed on Mar. 3, 2008.

(51) Int. Cl.
*G05F 1/575* (2006.01)
*B01J 13/04* (2006.01)

(52) U.S. Cl.
CPC ..... *B01J 13/04* (2013.01)

(58) Field of Classification Search
CPC ..... B01J 13/04; F27D 13/00
USPC ..... 323/282, 284, 285
See application file for complete search history.

(56) References Cited

U.S. PATENT DOCUMENTS

| | | | | |
|---|---|---|---|---|
| 6,809,560 | B1 | 10/2004 | Wrathall | |
| 6,954,055 | B2 | 10/2005 | Umemoto et al. | |
| 7,202,652 | B2 * | 4/2007 | Umemoto et al. | 323/284 |
| 7,327,127 | B2 * | 2/2008 | Ho | 323/271 |

FOREIGN PATENT DOCUMENTS

| | | |
|---|---|---|
| CN | 1470968 | 1/2004 |
| CN | 101960700 | 1/2011 |

(Continued)

OTHER PUBLICATIONS

Bae, Jin Yong; "Written opinion of the International Searching Authority" for corresponding PCT Application No. PCT/US2009/035821; Oct. 19, 2009, 4 pages.

(Continued)

*Primary Examiner* — Linh M Nguyen
(74) *Attorney, Agent, or Firm* — Fogg & Powers LLC

(57) ABSTRACT

A DC to DC converter circuit includes circuitry for generating a PWM waveform signal at a phase node of a DC to DC converter responsive to an input voltage and a [monitor] *monitored* output voltage. The circuitry further includes a high side switching transistor connected between the input voltage and a phase node and a low side switching transistor connected between the phase node and ground. An output filter is connected to the circuitry for generating the PWM waveform signal. The output filter includes an inductor having a first side connected to the phase node and a second side connected to an output voltage node. Detection circuitry detects zero current crossings in the inductor responsive to a voltage across the high side switching transistor and a voltage across the low side switching transistor.

17 Claims, 2 Drawing Sheets

(56) References Cited

FOREIGN PATENT DOCUMENTS

| | | | |
|---|---|---|---|
| JP | 2000092824 | | 3/2000 |
| JP | 2000092824 | A | 3/2000 |
| JP | 2004056982 | | 2/2004 |
| JP | 2004056982 | A | 2/2004 |
| JP | 2005253253 | | 9/2005 |
| JP | 2005253253 | A | 9/2005 |
| JP | 2006288156 | | 10/2006 |
| JP | 2006288156 | A | 10/2006 |
| JP | 2007006651 | | 1/2007 |
| JP | 2007006651 | A | 1/2007 |
| TW | 200945749 | | 11/2009 |
| TW | I483528 | | 5/2015 |
| WO | 2009111438 | | 9/2009 |

OTHER PUBLICATIONS

Bae, Jin Yong; "Written opinion of the International Searching Authority" for corresponding PCT Application No. PCT/US2009/035821; Oct. 19, 2009.

* cited by examiner

HIGH-SIDE SENSING OF ZERO INDUCTOR CURRENT FOR STEP-DOWN DC-DC CONVERTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one application has been filed for the reissue of U.S. Pat. No. 8,067,929. In addition to the present application, U.S. application Ser. No. 14/984,789 is a divisional reissue of the present application and was filed on Dec. 30, 2015.*

CROSS-REFERENCE TO RELATED APPLICATIONS

The *present* application *is for reissue of U.S. Pat. No. 8,067,929, filed Sep. 4, 2008, which patent* claims benefit of U.S. Application Ser. No. 61/033,259, filed Mar. 3, 2008, and entitled HIGH-SIDE SENSING OF ZERO INDUCTOR CURRENT FOR STEP DOWN DC-DC CONVERTER, *and* which [is] *patent and application are* incorporated herein by reference.

TECHNICAL FIELD

The present invention relates to DC to DC converters, and more particularly, to the sensing of zero inductor currents using both high-side and low-side switching transistors within a DC to DC converter.

BACKGROUND

DC to DC voltage regulators are used for maintaining a consistent output voltage for application to digital and analog circuitries within various circuit devices. An applied input voltage may vary for various reasons. However, despite these variances in the input voltage it is necessary to maintain the voltage applied to various internal circuitries at a consistent level that does not adversely effect the operation of the associated circuit. A DC to DC voltage converter adequately provides this functionality. The DC to DC voltage converter includes an inductor therein having a current passing there through. Effectively sensing the zero crossing of this inductor current within the DC to DC converter is an important feature for synchronous DC to DC converters.

The zero crossing detection of the inductor current is a critical factor that the DC to DC converter needs in order to determine on/off state of the low side switching transistor in order to save energy and improve the overall efficiency at the DC to DC converter. Improving the efficiency will enable the extension of the battery life of the associated electrical circuit. In prior art environments, the inductor current zero crossing is detected by sensing voltage through the low side switching transistor. Typically, when determining zero inductor current, a determination is made when the current decreases from a particular value to zero. The inductor current decreases only when the low side switching transistor is turned on. This makes traditional zero crossing sensing techniques applicable only during the on condition of the low side switching transistor.

However, the use of the low side switching transistor to determine a conductor current zero crossing has certain limitations. One limitation arises when the switching frequency of the switching transistors of the DC to DC converter increases. As the switching frequency increases, the switching cycle becomes shorter. Therefore for the same duty cycle, both the turn on and the turn off time become smaller. At particular points, the turn on time of the low side switching transistor is so short that the length of time that the transistor is turned on is not sufficient to enable a sensing device to respond to the "on" state of the low side switching transistor. This causes a problem with using the low side switching transistor "on" condition as an indication of zero crossing inductor current sensing. Thus, there is a need for [a] *an* improved method for detecting inductor current zero crossings in a DC to DC converter.

SUMMARY

The present invention, as disclosed and described herein, comprises in one aspect thereof a DC to DC converter including circuitry for generating a PWM waveform at a phase node of a DC to DC converter responsive to an input voltage and a monitored output voltage. The circuitry further comprises a high side switching transistor connected between the input voltage and the phase node and a low side switching transistor connected between the phase node and ground. An output filter connected to the circuitry for generating the PWM waveform signal at the phase node includes an inductor having a first side connected to the phase node and a second side connected to the output voltage node. Detection circuitry detects zero current crossing within the inductor responsive to a voltage across both the high side switching transistor and a voltage across the low side switching transistor.

BRIEF DESCRIPTION OF THE DRAWINGS

For a more complete understanding, reference is now made to the following description taken in conjunction with the accompanying Drawings in which.

DETAILED DESCRIPTION

Figure 1:
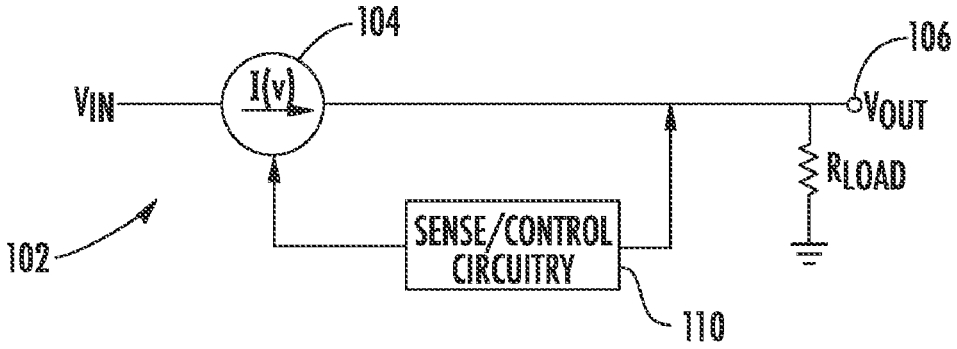
FIG. 1 is a functional block diagram of a voltage regulator circuit.

Referring now to the drawings, wherein like reference numbers are used herein to designate like elements throughout, the various views and embodiments of high-side sensing of zero inductor current for step down dc-dc converter are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments. Although the preferred embodiment has been described in detail, it should be understood that various changes, substitutions and alterations can be made therein without departing from the spirit and scope of the invention as defined by the appended claims.

Referring now to the drawings, and more particularly to FIG. 1, there is illustrated a voltage regulator circuit 102. Every electronic circuit is designed to operate off of some type of voltage supply which is assumed to be constant. A voltage regulator provides this constant DC output voltage and contains circuitry that continuously holds the output voltage at the designed value regardless of changes in load current or input voltage. A voltage regulator operates by using a voltage controlled current/voltage source 104 to force a fixed voltage to appear at the regulator output terminal 106. A sense/control circuitry 110 monitors the output voltage, and adjusts the current source 104 to hold the output voltage at the desired level. The design limit of the current source 104 defines the maximum load current the voltage regulator 102 can source and still maintain regulation of the output voltage.

The output voltage is controlled using a feedback loop which requires some type of compensation to assure loop stability. Most voltage regulators have built-in compensation and are completely stable without external components. Some regulators require some external capacitance connected from the output lead to ground to ensure regulator stability. Another characteristic of a voltage regulator is that it requires a finite amount of time to correct the output voltage after a change in a load current demand. The time lag defines the characteristic transient response of the voltage regulator, which is a measure of how fast the voltage regulator returns to steady state conditions after a load change. Voltage regulation may be used in any number of electronic devices to control an output voltage.

Figure 2:
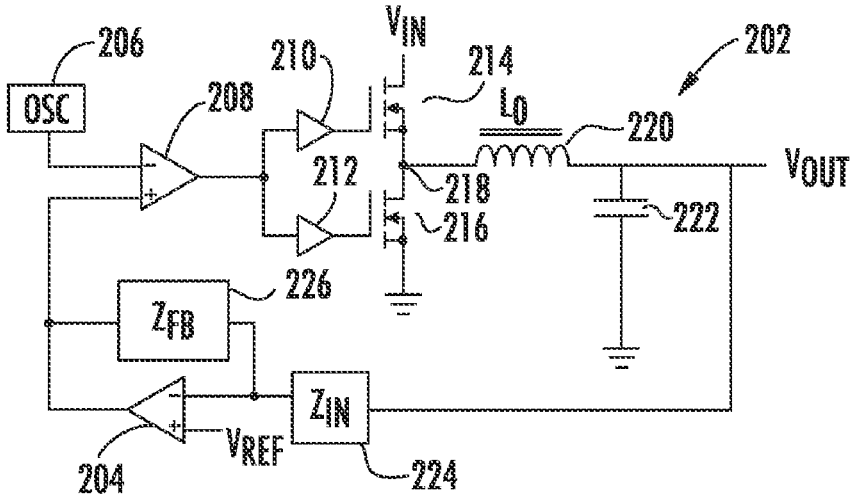
FIG. 2 is a schematic diagram of a voltage regulator with a PWM converter circuit.

Referring now to FIG. 2, there is illustrated a voltage regulator within a PWM DC-DC converter circuit 202. The output voltage VOUT is regulated to the reference voltage signal VREF applied to a positive input of error amplifier 204. The error amplifier 204 output is compared with the output of oscillator 206, which generates a triangular waveform, at the PWM comparator 208. The output of the PWM comparator 208 is applied to driver circuits 210 and 212, which drive the gates of high side switching transistor 214 and low side switching transistor 216. This process provides a pulse width modulated waveform with an amplitude of VIN at a phase node 218 connected to a first side of inductor 220. The PWM waveform provided from phase node 218 is smoothed by an output filter consisting of inductor 220 and capacitor 222. The error amplifier 204 has an input impedance ZIN 224 and an FB (Feed back) pin impedance ZFB at 226. The input impedance 224 and the FB pin impedance 226 comprise a compensation loop for the error amplifier 204.

Figure 3:
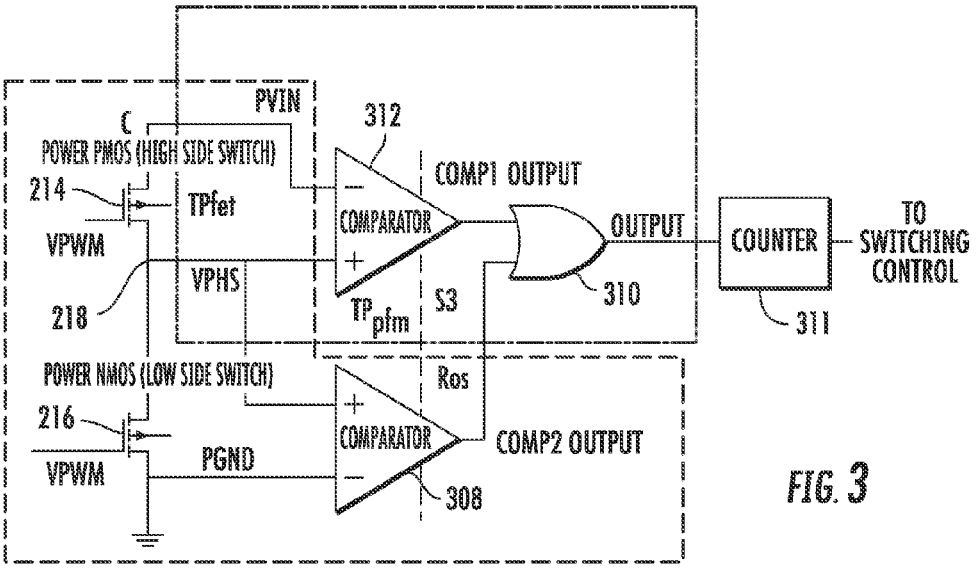
FIG. 3 is a schematic diagram of the circuitry for detecting a zero inductor current within a step down DC to DC converter.

Referring now to FIG. 3, there is illustrated a schematic diagram of the circuitry for detecting the inductor current zero crossings using each of the high side switching transistor 214 and the low side switching transistor 216 described previously with respect to FIG. 2. The high side switching transistor 214 is connected between the input voltage PVIN and the phase node 218. As illustrated previously in FIG. 2, the phase node 218 is the node connected to the inductor 220 through which the inductor current zero crossing is to be detected. The low side switching transistor 216 is connected between the phase node 218 and ground. A first comparator 308 has its inputs connected to the phase node 218 and ground respectively. This enables detecting of the voltage across the low side switching transistor to determine its on/off state. The output of the comparator 308 is connected to a first input of an OR gate 310. A second comparator 312 has its inputs connected to the input voltage node PVIN and to the phase node 218. This enables detecting of the voltage across the high side switching transistor to determine its on/off state. The output of the OR gate 310 is connected to a counter 311. The counter counts the number of clock cycles that the output signal goes high. If the counter 311 monitors eights continuous clock cycles high for the output signal, this indicates that either the COMP 1 or COMP 2 has detected zero crossings for eight continuous clock cycles which will initiate the pulse frequency modulation (PFM control mode). Thus, the output signal is used in the PWM mode (CCM mode) to initiate the PFM control mode. The output of comparator 312 is connected to a second input of the OR gate 310.

The higher the duty cycles or switching frequency of the DC to DC converter, the narrower the pulse width provided across the low side switching transistor 216. The comparator 308 is connected to monitor the voltage across the low side switching transistor 216 between the phase node 218 and ground. When the inductor current reaches zero or is below zero while the low side switching transistor is turned "on", the voltage at the phase node 218 is equal to or higher than the ground voltage PGND at the ground node. When this condition occurs, the output of the comparator 308 goes to a logic high ("one") level due to the value of the voltage at the phase node VPHS minus the voltage PGND at the ground node changing from a negative value to a positive value. In this manner, an inductor current zero crossing is detected.

However, every comparator such as comparator 308 has speed limitations and requires a certain amount of time in order to respond at the output to changes within the input difference applied to the inputs of the comparator 308. As the switching frequency or duty cycle of the DC to DC converter increases (i.e. VOUT is close to VIN), the "on" time of the low side switching transistor 216 becomes shorter and shorter. The higher the duty cycle/switching frequency of the DC to DC converter, the narrower the pulse width applied to the switching transistors. At a certain point, the comparator 308 will have no time to respond to voltage changes across the low side switching transistor 216 because of the short "on" time of the transistor 216. When the low side switching transistor 216 "on" time is shorter than the response time of the comparator 308, there will be no detection of the voltage change across the transistor 216 by the comparator 308. However, this short-coming may be overcome by monitoring the voltage across the high side switching transistor 214 using a second comparator 312.

When the response time of the comparator 308 is insufficient to detect the "on" time of the low side switching transistor 216, the zero current crossing within the inductor 220 [can not] *cannot* be detected and the DC to DC converter [can not] *cannot* change from PWM (pulse width modulation) mode to PFM (pulse frequency modulation) mode, even when the load current reaches zero. The addition of comparator 312 and OR gate 310 enables this problem to be overcome. The comparator 312 enables the inductor current zero crossing point to also be detected during the "on" time of the high side switching transistor 214. When the inductor current is zero or negative, the phase voltage VPHS at node 218 is equal to or higher than the input voltage PVIN, and the output of the comparator 312 is triggered to a logical high level ("one") due to the change of the phase node voltage VPHS minus the input node voltage VPVIN from negative to positive. This enables the inductor current zero crossing within the inductor 220 to be detected during the high side switching transistor 214 "on" time.

The outputs of comparator 312 and comparator 308 are ORed together by the OR gate 310 to generate an inductor current zero crossing level detector that measures zero crossing values across a broader frequency and duty cycle range than merely the comparator 308 monitoring the low side transistor 216. Thus, an indication of the zero current crossing within the inductor indicated by the voltage across either of the high side switching transistor 214 or the low side switching transistor 216 may cause the output of the OR gate 310 to be triggered indicating the zero current crossing detection. When the duty cycle of the DC to DC converter is high and comparator 308 does not have a sufficient response time to respond to voltage changes across the transistor 216, the longer "on" time of the high side switching transistor 214 due to its fixed switching frequency will enable sufficient time for the comparator 312 to detect voltage changes and respond to inductor current zero crossings. The same conditions occur when the duty cycle is at a very low level and comparator 312 has more time to detect inductor current zero crossings. As described previously, when the output of the OR gate 310 is determined to detect zero crossing for eight continuous clock cycles by the counter 311, this is used to initiate the PFM control mode within the switching control circuitry of the PWM controller associated with the regulator. Comparator 312 and comparator 308 are never on at the same time. Comparator 312 is on after the high-side switching transistor is turned on, while comparator 308 is turned on after the low-side switching transistor is turned on. While the comparator 308 is disabled, the output of the comparator is forced to a logical low level. When the comparator 312 is disabled, its output is also forced to a logical low level. The output of the OR gate 310 is connected to a counter 311. The counter counts the number of clock cycles that the output signal goes high. If the counter 311 monitors eight continuous clock cycles high for the output signal, this indicates, that either the COMP 1 or COMP 2 has detected zero crossings for eight continuous clock cycles which will initiate the pulse frequency modulation (PFM control mode). Thus the output signal is used in the PWM mode (CCM mode) to initiate the PFM control mode. Thus, a complementary detection system is provided.

Figure 4:
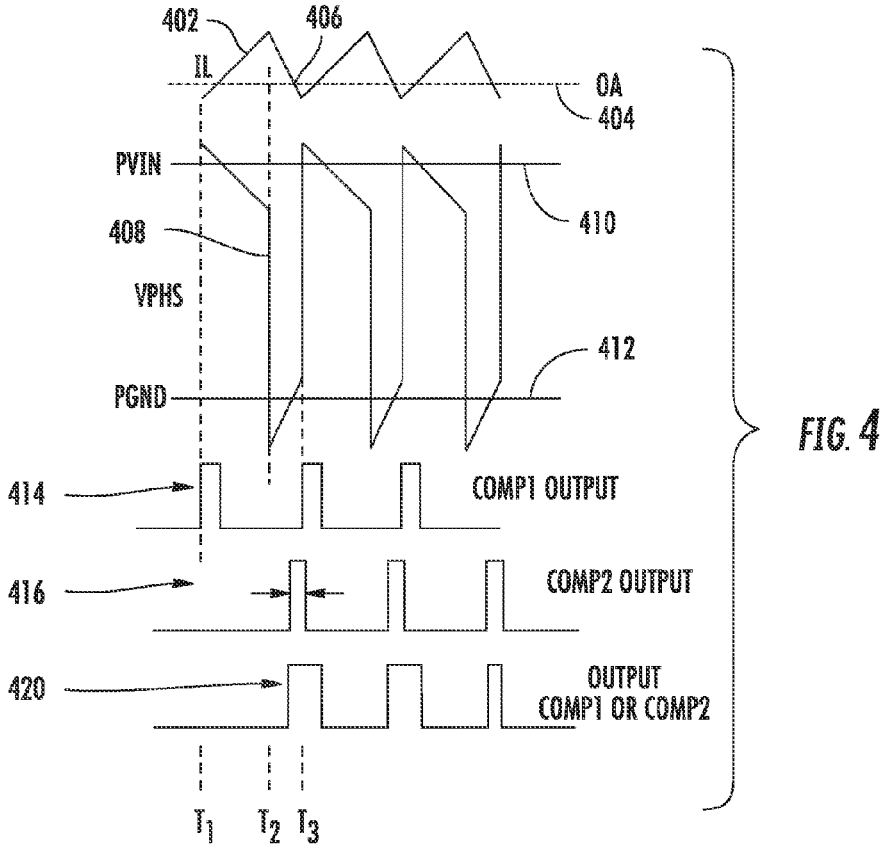
FIG. 4 illustrates the wave forms associated with the operation of the circuit of FIG. 3.

Referring now to FIG. 4, there are illustrated the [wave forms] *wave-forms* of the various signals at particular nodes within the circuit described with respect to FIG. 3. The waveform $I_L$ 402 represents the inductor current through the inductor 220 of a [DC to DC] *DC-to-DC* converter. The current through the [conductor] *inductor 220* is represented by a sawtooth type waveform that goes above and below a zero [amp] *ampere (0 A)* inductor current indicated generally by the dashed line 404. The inductor current is increasing from [times] *time* $T_1$ [one] to [times] *time* $T_2$ and is decreasing from time $T_2$ to time $T_3$. This pattern repeats throughout the waveform 402. A zero crossing of the inductor current is [indicating] *indicated* generally at 406. Of course numerous other occurrences of zero crossings within the waveform are also present.

The phase node voltage waveform VPHS is illustrated generally by waveform 408. Additionally illustrated with respect to this waveform are the input voltage which is indicated as a consistent voltage [VPVIN] *PVIN* 410 and the ground voltage indicated by PGND 412. The voltage at the phase node 218 is decreasing from [times] *time* $T_1$ to [times] *time* $T_2$. At time $T_2$ the voltage *VPHS* drops below PGND 412. The voltage *VPHS* at the phase node [420] *218* then begins increasing from time $T_2$ to time $T_3$. This process is then repeated.

The output voltage of comparator 308 is represented by voltage [wave form 414] *wave-form 416*. The output of comparator 308 goes high at each instance of the *decreasing* inductor current crossing zero [at times $T_1$, $T_3$, etc]. The output of comparator 312 is indicated generally by the waveform [416] *414*. This [pulse] *comparator 312* monitors the voltage across the high side transistor and provides an indication when the phase voltage VPHS is equal to or higher than the input voltage [VPVIN] *PVIN*. The OR gate output, represented generally by waveform 420, provides a wider pulse when both the outputs of the [comparator] *comparators* 308 and 312 have gone high responsive to a [zero current] *zero-current* crossing or additionally registers a narrower pulse responsive to the output of the comparator 312 when only the comparator 312 may detect the zero current crossing due to the frequency/duty cycle of the DC to DC voltage [inverter] *converter* being [to] *too* high. Therefore, using the above described system and method, there are no duty cycle limitations to the circuitry as compared with prior art implementations. [The] *Therefore, the* circuitry can [achieve a truly] *detect a zero-current crossing point during PWM mode, and transition from PWM mode to PFM mode, even while the power supply is operating at a* 100% duty cycle *in* PWM [to PFM transition] *mode*.

It will be appreciated by those skilled in the art having the benefit of this disclosure that this high-side sensing of zero inductor current for step down dc-dc converter provides an improved inductor current zero crossing detector. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A [DC to DC] *DC-to-DC* converter circuit, comprising:

circuitry [for generating] *configured to generate* a PWM waveform signal of the [DC to DC] *DC-to-DC* converter responsive to an input voltage and a monitored output voltage, the circuitry further comprising a [high side] *high-side* switching transistor connected between the input voltage and [the] *a* phase node and a [low side] *low-side* switching transistor connected between the phase node and ground;

an output filter connected to the circuitry [for generating] *and configured to generate* the PWM waveform signal, the output filter including an inductor having a first side connected to the phase node and a second side connected to an output voltage node;

detection circuitry [for detecting zero current] *configured to detect zero-current* crossings in the inductor responsive to a voltage across the [high side] *high-side* switching transistor and a voltage across the [low side] *low-side* switching transistor; and wherein the detection circuitry [detects] *is configured to detect* [zero current crossing] *zero-current crossings* in the inductor [using the turn on time of a high side] *during a turn-on time of the high-side* switching transistor [at] *while circuitry is operating in* a frequency range [causing] *that causes* a [turn on] *turn-on* time of [a low side] *the low-side* switching transistor to be too short to detect the [zero current crossing] *zero-current crossings* in the inductor using the [low side] *low-side* switching transistor.

2. The [DC to DC] *DC-to-DC* converter circuit of claim 1, wherein the detection of the zero current crossings in the inductor enables the [DC to DC] *DC-to-DC* converter to pass from a PWM mode to a PFM mode.

3. The [DC to DC] *DC-to-DC* converter circuit of claim 1, wherein the detection circuitry further comprises:

a first comparator [for comparing] *configured to compare* a first voltage at the phase node with a second voltage at the ground and [generating] *to generate* a first output responsive thereto;

a second comparator [for comparing] *configured to compare* the first voltage at the phase node with a third voltage at an input voltage node and [generating] *to generate* a second output responsive thereto; and a logical OR gate connected to receive the first output and the second output and *to* generate a third output responsive thereto, wherein the third output indicates the [zero current] *zero-current* crossings in the inductor.

4. The [DC to DC] *DC-to-DC* converter circuit of claim 3, wherein the first comparator [providing] *is configured to generate* the first output at a first logical level [is] responsive to a difference between the first voltage and the second voltage going from a negative value to a positive value and further wherein the second comparator [providing] *is configured to generate* the second output at the first logical level [is] responsive to a difference between the first voltage and the third voltage going from a negative value to a positive value.

5. The [DC to DC] *DC-to-DC* converter circuit of claim 3, wherein the detection circuitry [can] *is configured to* detect the [zero current] *zero-current* crossings in the inductor [when] *while* the operating frequency of the [DC to DC] *DC-to-DC* converter [operates at] *is in* a frequency range causing a [turn on] *turn-on* time of the [low side] *low-side* switching transistor to be too short for the first comparator to detect the [zero current] *zero-current* crossings in the inductor.

6. The [DC to DC] *DC-to-DC* converter circuit of claim 2, wherein the detection circuitry [detects the zero current] *is configured to detect the zero-current* crossings in the inductor [using the turn on time of high side] *during the turn-on time of the high-side* switching transistor [at] *while the circuitry is operating in* a frequency range [causing a turn on time of the low side] *which causes the turn-on time of the low-side* switching transistor to be too short for the first comparator to detect the [zero current] *zero-current* crossings in the inductor.

7. Detection circuitry for detecting [zero current] *zero-current* crossings [through] an inductor of a [DC to DC] *DC-to-DC* converter circuit, comprising:

a first comparator [for detecting a turn on time of a low side] *configured, during a turn-on time of a low-side* switching transistor [by comparing], *to compare* a first voltage at [the] *a* phase node with a second voltage at a ground node and [generating] *to generate* a first output responsive thereto;

a second comparator [for detecting a turn on time of a high side] *configured, during a turn-on time of a high-side* switching transistor [by comparing], *to compare* the first voltage at the phase node with a third voltage at an input voltage and [generating] *to generate* a second output responsive thereto;

a logical OR gate connected to receive the first output and the second output and *to* generate a third output responsive thereto, wherein the third output indicates the [zero current] *zero-current* crossings in the inductor; and wherein the detection circuitry [can] *is configured to* detect the [zero current] *zero-current* crossings in the inductor [when] *while* the operating frequency of the [DC to DC] *DC-to-DC* converter [operates at] *is in* a frequency range causing a [turn on time of the low side] *turn-on time of the low-side* switching transistor to be too short for the first comparator to detect the [zero current] *zero-current* crossings in the inductor.

8. The detection circuit of claim 7, wherein the detection of the [zero current] *zero-current* crossings in the inductor enables the [DC to DC] *DC-to-DC* converter to pass from a PWM mode to a PFM mode.

9. The detection circuit of claim 7, wherein the first comparator [providing] *is configured to generate* the first output at a first logical level [is] responsive to a difference between the first voltage and the second voltage going from a negative value to a positive value and further wherein the second comparator [providing] *is configured to generate* the second output at the first logical level [is] responsive to a difference between the first voltage and the third voltage going from a negative value to a positive value.

10. The detection circuit of claim 7, wherein the detection circuitry [detects] *is configured to detect* the [zero current] *zero-current* crossings in the inductor [using the turn on time of high side] *during the turn-on time of the high-side* switching transistor [at] *while the detection circuitry is operating in* a frequency range [causing a turn on time of the low side] *which causes the turn-on time of the low-side* switching transistor to be too short for the first comparator to detect the [zero current] *zero-current* crossings in the inductor.

11. A method for detecting [zero current] *zero-current* crossings within a [DC to DC] *DC-to-DC* converter circuit, comprising the steps of:

generating a PWM waveform signal of the [DC to DC] *DC-to-DC* converter responsive to an input voltage and a monitored output voltage;

filtering the PWM waveform signal through an output filter including [and] *an* inductor to generate an output voltage; *and* detecting [zero current] *the zero-current* crossings in the inductor responsive to [a voltage] *voltages* across both a [high side] *high-side* switching transistor and a [low side] *low-side* switching transistor [when] *while* the operating frequency of the [DC to DC] *DC-to-DC* converter operates [at] *in* a frequency range causing a [turn on] *turn-on* time of the [low side] *low-side* switching transistor to be too short to detect the [zero current crossing] *zero-current crossings* in the inductor using only the [low side] *low-side* switching transistor.

12. The method of claim 11, wherein the step of detecting further comprises the steps of:

detecting an "on" state of the [low side] *low-side* switching transistor;

detecting an "on" state of the [high side] *high-side* switching transistor; and generating an indication of the [zero current crossing] *zero-current crossings* responsive to the detection of the "on" state of *at least one of* the [low side] *low-side* switching transistor and the ["on" state of at least one of the high side] *high-side* switching transistor.

13. The method of claim 11 further including the step of switching the [DC to DC] *DC-to-DC* converter from a PWM mode to a PFM mode responsive to the detection of the [zero current] *zero-current* crossings in the inductor.

14. The method of claim 11, wherein the step of detecting further comprises the steps of:

comparing a first voltage at a phase node on a first side of the [low side] *low-side* switching transistor with a second voltage at a ground node on a second side of the [low side] *low-side* switching transistor;

generating a first output responsive to the comparison of the first voltage and the second voltage;

comparing the first voltage at the phase node on a first side of the [high side] *high-side* switching transistor with a third voltage at an input voltage node on a second side of the [high side] *high-side* switching transistor; and generating a second output responsive to the comparison of the first voltage and the third voltage; and logically ORing the first output and the second output to generate a third output, wherein the third output indicates the [zero current] *zero-current* crossings in the inductor.

15. The method of claim 14, wherein the step of generating the first output further comprises the step of generating the first output at a first logical level responsive to a difference between the first voltage and the second voltage going from a negative value to a positive value.

16. The method of claim 15, wherein the step of generating the second output further comprises the step of generating the second output at the first logical level responsive to a difference between the first voltage and the third voltage going from a negative value to a positive value.

17. Detection circuitry for detecting [zero current] *zero-current* crossings through an inductor of a [DC to DC] *DC-to-DC* converter circuit, comprising:

a first comparator [for detecting a turn on time of a low side] *configured, during a turn-on time of a low-side* switching transistor [by comparing], *to compare* a first voltage at [the] *a* phase node with a second voltage at a ground node and [generating] *to generate* a first output responsive thereto;

a second comparator [for detecting a turn on time of a high side] *configured, during a turn-on time of a high-side* switching transistor [by comparing], *to compare* the first voltage at the phase node with a third voltage at an input [voltage] *node* and [generating] *to generate* a second output responsive thereto;

a logical OR gate connected to receive the first output and the second output and *to* generate a third output responsive thereto, wherein the third output indicates the [zero current] *zero-current* crossings [in] *through* the inductor; and wherein the detection circuitry [detects the zero current crossings in the inductor using the turn on time of high side] *is configured to detect the zero-current crossings through the inductor using the high-side switching transistor during the turn-on time of the high-side* switching transistor [at] *while the low-side switching transistor is operating in* a frequency range [ causing a turn on time of the low side] *which causes the turn-on time of the low-side* switching transistor to be too short for the first comparator to detect the [zero current crossings in the inductor] *zero-current crossings through the inductor using the low-side switching transistor*.

* * * * *